United States Patent
Nakahata et al.

(10) Patent No.: US 9,011,558 B2
(45) Date of Patent: Apr. 21, 2015

(54) IMAGE DISPLAYING DEVICE AND IMAGE DISPLAYING SYSTEM

(75) Inventors: Yuji Nakahata, Kanagawa (JP); Toshiaki Suzuki, Kanagawa (JP)

(73) Assignee: Sony Corporation (JP)

(*) Notice: Subject to any disclaimer, the term of this patent is extended or adjusted under 35 U.S.C. 154(b) by 426 days.

(21) Appl. No.: 12/802,877

(22) Filed: Jun. 16, 2010

(65) Prior Publication Data

US 2011/0001806 A1  Jan. 6, 2011

(30) Foreign Application Priority Data

Jul. 3, 2009  (JP) ................................ P2009-159043

(51) Int. Cl.
| | | |
|---|---|---|
| *H04N 13/04* | (2006.01) | |
| *G09G 3/00* | (2006.01) | |
| *G09G 3/20* | (2006.01) | |

(52) U.S. Cl.
CPC ....... *H04N 13/0497* (2013.01); *H04N 13/0422* (2013.01); *H04N 13/0438* (2013.01); *G09G 3/003* (2013.01); *G09G 3/2022* (2013.01); *G09G 3/2055* (2013.01)

(58) Field of Classification Search
CPC ... G02B 27/017; G09G 3/007; G09G 3/3406; H04N 5/66; H04N 5/7441; H04N 5/7491; H04N 9/30
USPC .......... 348/56, 63, 88, 744; 345/147, 204, 63, 345/88, 56, 599; 358/180, 451; 359/462
See application file for complete search history.

(56) References Cited

U.S. PATENT DOCUMENTS 5,138,454 A * 8/1992 Parulski ......................... 348/581
5,218,459 A * 6/1993 Parulski et al. ............... 358/451
(Continued)

FOREIGN PATENT DOCUMENTS

| EP | 1136974 A1 | 9/2001 |
| EP | 1271966 A1 | 1/2003 |

(Continued)

OTHER PUBLICATIONS

Office Action from Japanese Application No. 2009-159043, dated Aug. 15, 2013.
(Continued)

*Primary Examiner* — Y Lee
*Assistant Examiner* — Salame Amr
(74) *Attorney, Agent, or Firm* — Lerner, David, Littenberg, Krumholz & Mentlik, LLP

(57) ABSTRACT

An image displaying device includes: a display section cyclically switching a plurality of image streams, thereby time-divisionally displaying the plurality of image streams, each of the plurality of image streams being provided for corresponding one of a plurality of shutter mechanisms performing opening-closing operations at timings different from each other; and a dithering processing section performing a dithering process on a plurality of input images by using a plurality of masks, each of the plurality of masks having a pattern of two-dimensionally-arranged grayscale values, the pattern differing from a pattern of another mask, and then supplying a plurality of resultant images produced through the dithering process to the display section. The dithering processing section controls the dithering process in such a manner that the plurality of masks are sequentially and cyclically switched in synchronization with shutter open timings for each of the shutter mechanisms.

4 Claims, 15 Drawing Sheets

(56) References Cited

U.S. PATENT DOCUMENTS

| | | | |
|---|---|---|---|
| 6,069,609 A * | 5/2000 | Ishida et al. | 345/596 |
| 6,184,969 B1 * | 2/2001 | Fergason | 349/196 |
| 6,816,141 B1 * | 11/2004 | Fergason | 345/88 |
| 2005/0110714 A1 * | 5/2005 | Lee | 345/63 |
| 2006/0033992 A1 * | 2/2006 | Solomon | 359/462 |
| 2006/0145979 A1 | 7/2006 | Lee et al. | |
| 2006/0208983 A1 | 9/2006 | Lee et al. | |
| 2006/0221067 A1 * | 10/2006 | Kim et al. | 345/204 |
| 2007/0070018 A1 | 3/2007 | Moon | |
| 2008/0225054 A1 * | 9/2008 | Kim et al. | 345/599 |
| 2009/0303397 A1 * | 12/2009 | Allen et al. | 348/744 |

FOREIGN PATENT DOCUMENTS

| | | |
|---|---|---|
| JP | 6324656 | 11/1994 |
| JP | 2000112428 A | 4/2000 |
| JP | 2001-134243 A | 5/2001 |
| JP | 2001215938 A | 8/2001 |
| JP | 2001-282190 A | 10/2001 |
| JP | 2005070652 | 3/2005 |
| JP | 2005128207 A | 5/2005 |
| JP | 2006-506664 A | 2/2006 |
| JP | 2006-506665 A | 2/2006 |
| JP | 2006065269 A | 3/2006 |
| JP | 2007-094411 A | 4/2007 |
| JP | 2009507401 A | 2/2009 |

OTHER PUBLICATIONS

European Search Report from EP Application No. 10166664, dated May 27, 2014.

* cited by examiner

| GRADATION VALUE | Panel Original | | | EYEGLASSES 1 | | | EYEGLASSES 3 | | |
|---|---|---|---|---|---|---|---|---|---|
| | R | G | B | R | G | B | R | G | B |
| 256 | 1023 | 1023 | 1023 | 1023 | 932 | 849 | 1023 | 960 | 988 |
| 240 | 980 | 974 | 942 | 982 | 871 | 792 | 979 | 892 | 899 |
| 224 | 919 | 903 | 860 | 921 | 817 | 734 | 918 | 838 | 832 |
| 208 | 857 | 842 | 792 | 859 | 761 | 677 | 856 | 782 | 767 |
| 192 | 799 | 781 | 727 | 801 | 703 | 621 | 798 | 723 | 704 |
| 176 | 736 | 717 | 660 | 739 | 642 | 569 | 735 | 661 | 639 |
| 160 | 670 | 650 | 598 | 674 | 585 | 514 | 669 | 601 | 580 |
| 144 | 605 | 586 | 537 | 608 | 526 | 463 | 604 | 541 | 520 |
| 128 | 539 | 520 | 476 | 542 | 467 | 407 | 537 | 480 | 461 |
| 112 | 471 | 454 | 412 | 473 | 404 | 352 | 470 | 417 | 399 |
| 96 | 399 | 383 | 348 | 403 | 343 | 300 | 399 | 353 | 338 |
| 80 | 331 | 317 | 290 | 333 | 285 | 254 | 330 | 292 | 282 |
| 64 | 266 | 257 | 232 | 268 | 225 | 197 | 266 | 233 | 225 |
| 48 | 192 | 184 | 173 | 195 | 164 | 151 | 192 | 169 | 169 |
| 32 | 126 | 125 | 127 | 129 | 116 | 118 | 126 | 118 | 125 |
| 16 | 83 | 93 | 107 | 98 | 88 | 103 | 93 | 89 | 108 |
| 0 | 0 | 0 | 0 | 0 | 0 | 0 | 0 | 0 | 0 |

IMAGE DISPLAYING DEVICE AND IMAGE DISPLAYING SYSTEM

CROSS-REFERENCE TO RELATED APPLICATION

The present application claims priority from Japanese Patent Application No. JP 2009-159043 filed in the Japanese Patent Office on Jul. 3, 2009, the entire content of which is incorporated herein by reference.

BACKGROUND OF THE INVENTION

1. Field of the Invention

The invention relates to an image displaying device and an image displaying system, each of which is of a time-division driving system utilizing, for example, shutter eyeglasses.

2. Description of the Related Art

In recent years, active matrix liquid crystal display (LCD) devices, provided with a thin-film transistor (TFT) for each pixel, have been used commonly for displays of devices such as low-profile televisions, portable terminals, and so forth. In such liquid crystal display devices, in general, an image signal is line-sequentially written to an auxiliary capacitor and a liquid crystal element of each pixel from a top to a bottom of a screen, to drive each of the pixels.

Depending upon an application, some of the liquid crystal display devices perform driving (which may be hereinafter referred to as "time-division driving"), in which one frame period is divided into a plurality of time periods and different images are displayed for the respective divided time periods. Examples of the liquid crystal display device utilizing the time-division driving include a liquid crystal display device utilizing a field-sequential system, a stereoscopic image displaying system which uses so-called "shutter eyeglasses", and so forth.

The field-sequential system is a driving system for performing color displaying, which is achieved by dividing one frame period into three periods, sequentially writing images corresponding to respective colors of red (R), green (G), and blue (B), and emitting respective color lights of R, G, and B from a backlight in synchronization with the writing of each of the images. In general, the liquid crystal display device spatially divides one pixel into a plurality of sub-pixels of R, G, and B, and thus has a reduced use-efficiency of light. However, the employment of the field-sequential system makes it possible to improve the use-efficiency.

The stereoscopic image displaying system utilizing the shutter eyeglasses divides one frame period into two periods, and alternately displays two images having a parallax between each other, which serve as an image for a left eye and an image for a right eye. Also, the stereoscopic image displaying system uses the shutter eyeglasses, which perform switching over between an opening operation and a closing operation of a left-eye section and a right-eye section, in synchronization with the alternate displaying of those two images. When a viewer sees a displayed image by wearing the shutter eyeglasses, the viewer can recognize the displayed image as a stereoscopic image.

Incidentally, in a typical two-dimensional image displaying device, there may be cases where the number of bits in an input original image and the number of bits that can be represented on a display are different. In order to address such cases, for example, a dithering process is often performed as a process for converting (i.e., reducing or expanding) the number of bits in an image signal. As for the dithering process, various proposals have been currently made, such as those proposed in Japanese Unexamined Patent Application Publication No. 2001-134243, No. 2001-282190, No. 2007-94411, No. 2006-506664 (published Japanese translation of a PCT application), and No. 2006-506665 (published Japanese translation of a PCT application), for example.

SUMMARY OF THE INVENTION

The inventors have found the following drawback associated with existing techniques. That is, when expanding or enhancing a gradation representation of an input image signal, a plurality of dithering masks, each having multiple kinds of gradation values which are arranged two-dimensionally in various patterns, are provided beforehand, and those dithering masks are time-divisionally switched over from one dithering mask to the other. Thereby, the respective gradation values disposed on the dithering masks are temporally and spatially averaged, and thus a pseudo halftone thereof is represented.

However, when such a dithering process for the two-dimensional displaying is applied to an image displaying system utilizing a time-division driving system, or applied to a stereoscopic image displaying system utilizing shutter eyeglasses in particular, the following drawback occurs. In the stereoscopic image displaying system, a left-eye section of the shutter eyeglasses is set to be in an opened state (a right-eye section is set to be in a closed state) during when an image for a left eye is displayed, and the right-eye section of the shutter eyeglasses is set to be in the opened state (the left-eye section is set to be in the closed state) during when an image for a right eye is displayed. Thus, when the dithering masks are switched over from one mask to the other by a similar procedure to that in the two-dimensional displaying, a part of the patterns of the dithering masks is interrupted or blocked by a closing operation of the shutter eyeglasses. Therefore, the patterns of the dithering masks are not properly averaged, and as a result, deterioration factors such as roughness and flicker are generated in a displayed image.

It is desirable to provide an image displaying device and an image displaying system, capable of enhancing a gradation level while suppressing deterioration in a displayed image, in a time-division driving system.

An image displaying device according to an embodiment includes: a display section cyclically switching a plurality of image streams, thereby time-divisionally displaying the plurality of image streams, each of the plurality of image streams being provided for corresponding one of a plurality of shutter mechanisms performing opening-closing operations at timings different from each other; and a dithering processing section performing a dithering process on a plurality of input images by using a plurality of masks, each of the plurality of masks having a pattern of two-dimensionally-arranged gradation-level values, the pattern differing from a pattern of another mask, and then supplying a plurality of resultant images produced through the dithering process to the display section, wherein the dithering processing section controls the dithering process in such a manner that the plurality of masks are sequentially and cyclically switched in synchronization with shutter open timings for each of the shutter mechanisms.

An image displaying system according to an embodiment includes: a plurality of shutter mechanisms performing opening-closing operations at timings different from each other; a display section cyclically switching a plurality of image streams, thereby time-divisionally displaying the plurality of image streams, each of the plurality of image streams being provided for corresponding one of the plurality of shutter mechanisms; and a dithering processing section performing a dithering process on a plurality of input images by using a plurality of masks, each of the plurality of masks having a pattern of two-dimensionally-arranged gradation-level values, the pattern differing from a pattern of another mask, and then supplying a plurality of resultant images produced through the dithering process to the display section, wherein the dithering processing section controls the dithering process so that the plurality of masks are sequentially and cyclically switched in synchronization with shutter open timings for each of the shutter mechanisms.

In the image displaying device and the image displaying system according to the embodiments, the dithering processing section so controls the plurality of masks, each of which has the pattern of two-dimensionally-arranged gradation-level values and in which the pattern differs from the pattern of another mask, that the plurality of masks are sequentially and cyclically switched in synchronization with the shutter open timings for each of the shutter mechanisms to perform the dithering process. Thus, the plurality of gradation-level values in each of the masks are averaged spatially and temporally, and thereby a halftone thereof is represented.

According to the image displaying device and the image displaying system of the embodiments, the dithering processing section so controls the plurality of masks, each of which has the pattern of two-dimensionally-arranged gradation-level values and in which the pattern differs from the pattern of another mask, that the plurality of masks are sequentially and cyclically switched in synchronization with the shutter open timings for each of the shutter mechanisms to perform the dithering process, when the display section cyclically switches the plurality of image streams, each of which is provided for corresponding one of the plurality of shutter mechanisms, to time-divisionally display the plurality of image streams. Therefore, it is possible to enhance a gradation representation while suppressing deterioration in a displayed image in a time-division driving system.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

FIG. 10 illustrates an example of a look-up table for chromaticity adjustment.

FIG. 15 is a schematic diagram illustrating patterns of dithering masks according a fourth modification.

DETAILED DESCRIPTION OF THE PREFERRED EMBODIMENTS

Hereinafter, an embodiment will be described in detail with reference to the accompanying drawings. The description will be given in the following order.

1. Embodiment (An example where a dithering process is used in a stereoscopic image displaying (twice-writing))
2. First Modification (An example of another dithering process in twice-writing)
3. Second Modification (An example of a dithering process in once-writing)
4. Third Modification (An example of another dithering process in once-writing)
5. Fourth Modification (An example of a four-by-four mask pattern)
6. Fifth Modification (An example of a multi-view system)
[Embodiment]
[Overall Configuration of Image Displaying System]

Figure 1:
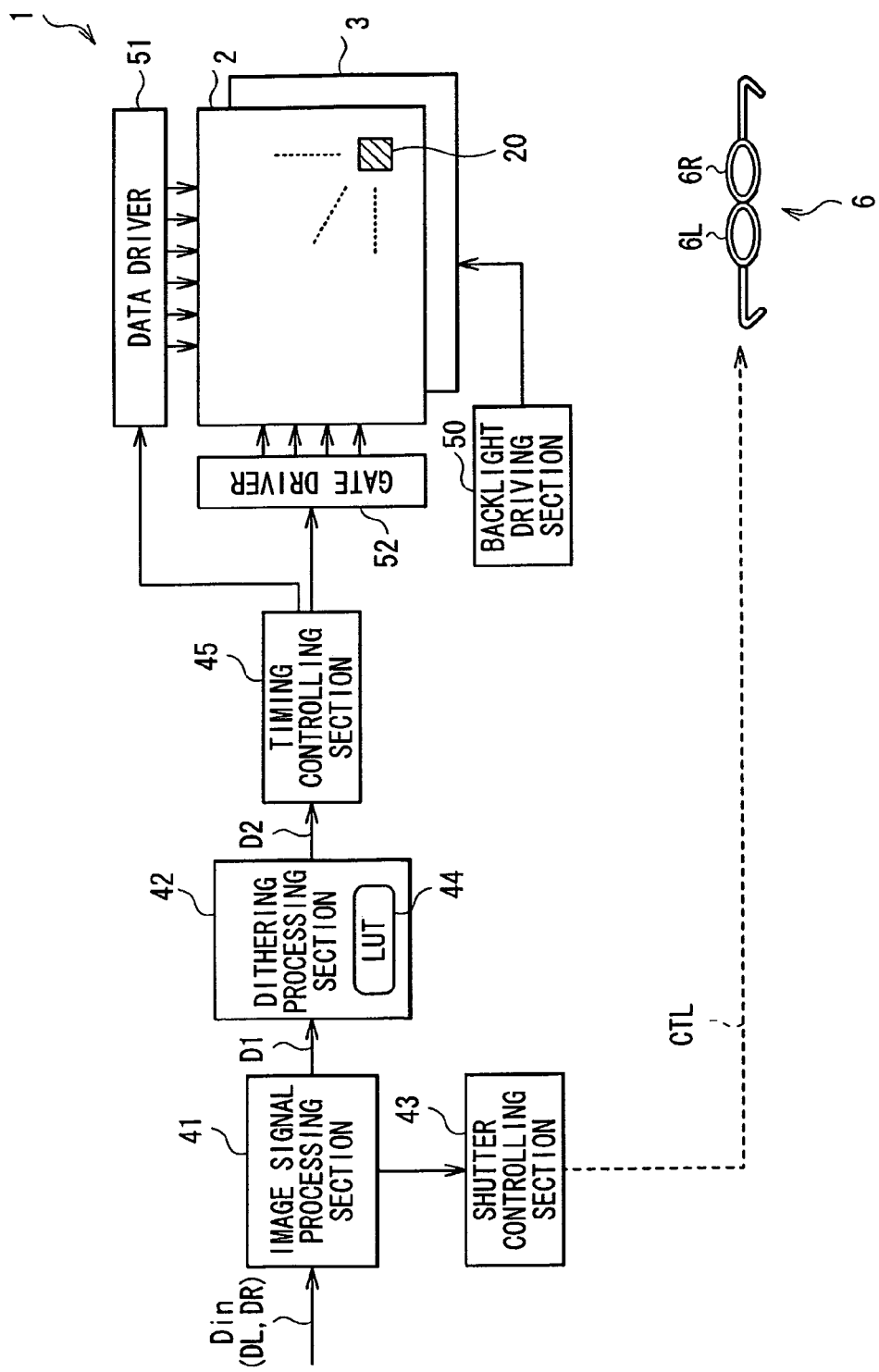
FIG. 1 is a block diagram illustrating an overall configuration of an image displaying system provided with a display device according to an embodiment of the invention.

FIG. 1 illustrates a block configuration of an image displaying system according to an embodiment of the invention. This image displaying system is a stereoscopic image displaying system utilizing a time-division driving system, and includes a liquid crystal display device 1 and shutter eyeglasses 6.
[Configuration of Liquid Crystal Display Device 1]

The liquid crystal display device 1 performs image displaying based on an input image signal Din. The input image signal Din includes a right-eye image signal DR and a left-eye image signal DL having a parallax between right and left. The liquid crystal display device 1 is provided with a liquid crystal display panel 2, a backlight 3, an image signal processing section 41, a dithering processing section 42, a shutter controlling section 43, a timing controlling section 45, a backlight driving section 50, a data driver 51, and a gate driver 52.

The backlight 3 is a light source for irradiating light toward the liquid crystal display panel 2. The light source 3 includes, light emitting diodes (LEDs), cold-cathode fluorescent lamp (CCFL), or other suitable light emitter, for example.

The liquid crystal display panel 2 modulates the light emitted from the backlight 3, based on an image voltage supplied from the data driver 51 in accordance with a drive signal supplied from the gate driver 52, to perform the image displaying based on the input image signal Din. More specifically, as will be described later in greater detail, the liquid crystal display panel 2 alternately displays a right-eye image based on the right-eye image signal DR and a left-eye image based on the left-eye image signal DL in a time-divisional fashion. The liquid crystal display panel 2 includes a plurality of pixels 20 which are arranged in a matrix as a whole.

Figure 2:
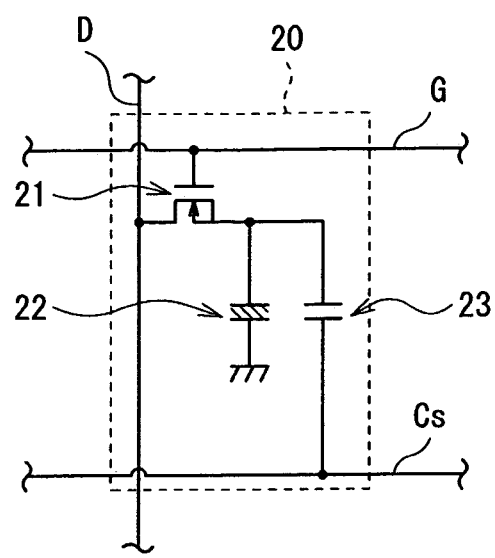
FIG. 2 is a circuit diagram illustrating an example of a detailed configuration of a pixel illustrated in FIG. 1.

With reference to FIG. 2, a detailed configuration of each of the pixels 20 will be described. FIG. 2 illustrates an example of a circuit configuration of a pixel circuit in each of the pixels 20. The pixel 20 includes a liquid crystal element 22, a thin-film transistor (TFT) element 21, and an auxiliary capacitor 23. The pixel 20 is connected with a gate line G for selecting the pixel 20 to be driven in a line-sequential fashion, a data line D for supplying an image voltage (i.e., the image voltage supplied from the data driver 51) to the pixel 20 to be driven, and an auxiliary capacitor line Cs.

The liquid crystal element 22 performs a displaying operation based on the image voltage supplied from the data line D via the TFT element 21 to one end of the liquid crystal element 22. The liquid crystal element 22 includes a liquid crystal layer (not illustrated) having a vertical alignment (VA) mode, a twisted nematic (TN) mode, or other suitable modes, and a pair of electrodes (not illustrated) sandwiching the liquid crystal layer, for example. One of the electrodes (i.e., a first end) in the liquid crystal element 22 is connected to a drain of the TFT element 21 and to a first end of the auxiliary capacitor 23, and the other (i.e., a second end) of the electrodes of the liquid crystal element 22 is connected to a ground. The auxiliary capacitor 23 is a capacitor for stabilizing accumulated electric charges of the liquid crystal element 22. A first end of the auxiliary capacitor 23 is connected to the first end of the liquid crystal element 22 and to the drain of the TFT element 21, and a second end thereof is connected to the auxiliary capacitor line Cs. The TFT element 21 is a switching element for supplying the image voltage, which is based on the image signal D1, to the first end of the liquid crystal element 22 and to the first end of the auxiliary capacitor 23, and is structured by a metal-oxide semiconductor-field effect transistor (MOSFET), for example. A gate of the TFT element 21 is connected to the gate line G, and a source of the TFT element 21 is connected to the data line D. The drain of the TFT element 21 is connected to the first end of the liquid crystal element 22 and to the first end of the auxiliary capacitor 23.

Returning back to FIG. 1, the image signal controlling section 41 performs, to the input image signal Din, a control of an order of output (writing order) of the right-eye image signal DR as an image stream and the left-eye image signal DL as an image stream, to generate the image signal D1. More specifically, the image signal controlling section 41 performs the control of the output order, such that the right-eye image signal DR and the left-eye image signal DL are outputted successively plural times (twice in the present embodiment), and such that those successive image signals are sequentially switched over in the time-divisional fashion within one frame period to be outputted. In the present embodiment, the image signal controlling section 41 generates the image signal D1, such that the image signals are outputted in an order of the left-eye image signal DL, the left-eye image signal DL, the right-eye image signal DR, and the right-eye image signal DR. In this embodiment, a period in which the left-eye image signal DL is successively outputted (written) twice in one frame period is referred to as "L sub-frame period", and a period in which the right-eye image signal DR is successively outputted (written) twice in one frame period is referred to as "R sub-frame period".

The shutter controlling section 43 outputs, to the shutter eyeglasses 6 described later, a timing control signal (a control signal CTL) of shutters which is in synchronization with a timing of the displaying of the images for the left eye and the right eye, in accordance with a control of timing by the image signal controlling section 41. In the present embodiment, the control signal CTL is a wireless signal such as an infrared signal. However, the control signal CTL can be a cable signal.

The dithering processing section 42 performs a dithering process which expands or enhances a gradation representation in the image signal D1 (i.e., the right-eye image signal DR and the left-eye image signal DL) outputted from the image signal controlling section 41, to generate an image signal D2. More specifically, as will be described later in greater detail, the dithering processing section 42 performs the dithering process by using a plurality of dithering masks (hereinafter simply referred to as a "mask") each having m-by-n matrix regions (in the present embodiment, m-by-n is 2-by-2), and by changing over those plurality of masks at a predetermined timing. The m-by-n regions of each of the masks correspond to an m-by-n pixel arrangement in an image, and each of the masks has a configuration in which two or more kinds of gradation levels or "gradation values" are arranged in a predetermined pattern. The arrangement pattern of the gradation values is different for each of the masks. These make it possible to enhance the gradation representation.

The dithering processing section 42 also performs a chromaticity adjusting process (a white balance adjusting process) on the image signal D2 applied with the dithering process described above. More specifically, the dithering processing section 42 holds chromaticity adjusting parameters which are mutually different for the respective kinds of the shutter eyeglasses 6, selects the chromaticity adjusting parameter corresponding to the kind of the shutter eyeglasses 6 used by a viewer, and performs the chromaticity adjustment based on the selected chromaticity adjusting parameter. In performing the chromaticity adjustment, the dithering processing section 42 utilizes a look-up table (LUT) 44 etc., for example. It is to be noted that, although the description is given with reference to an example where the dithering process is utilized to perform the chromaticity adjusting process, the dithering process in the embodiment of the invention is not limited thereto, but rather, can be utilized for various applications.

The timing controlling section 45 controls a timing of driving of each of the backlight driving section 50, the gate driver 52, and the data driver 51. The timing controlling section 45 also supplies the image signal D2 supplied from the dithering processing section 42 to the data driver 51. In one embodiment, the timing controlling section 45 may perform an overdrive process on the image signal D2, based on the gradation level of the image signal D2.

The gate driver 52 line-sequentially drives each of the pixels 20 in the liquid crystal display panel 2 along unillustrated scanning lines (gate lines G), in accordance with the timing control by the timing controlling section 45.

The data driver 51 supplies, to each of the pixels 20 in the liquid crystal display panel 2, the image voltage which is based on the image signal D2 supplied from the timing controlling section 45. More specifically, the data driver 51 performs a digital-to-analog (D/A) conversion on the image signal D2 to generate an analog image signal (i.e., the image voltage described above), and outputs the same to each of the pixels 20.

The backlight driving section 50 drives the backlight 3.

[Configuration of Shutter Eyeglasses 6]

The shutter eyeglasses 6 are used by a viewer and thus enable the viewer to see a stereoscopic image. The shutter eyeglasses 6 include a left-eye shutter 6L and a right-eye shutter 6R. Each of the left-eye shutter 6L and the right-eye shutter 6R is provided with a light-shielding shutter (not illustrated), which can be a liquid crystal shutter or other suitable elements, for example. The control signal CTL supplied from the shutter controlling section 43 controls a valid state (i.e., a closed state) and an invalid state (i.e., an opened state) of a light-shielding function of the light-shielding shutters. More specifically, the shutter eyeglasses 6 perform an opening-closing operation in synchronization with the changing over of the displaying of the left-eye image and the right-eye image in the liquid crystal display device 1. In the present embodiment, the left-eye shutter 6L and the right-eye shutter 6R each correspond to one illustrative example of a "shutter mechanism".

[Operation and Effect of Image Displaying System]

[1. Operation of Stereoscopic Image Displaying]

First, an operation of the stereoscopic image displaying in the image displaying system according to the present embodiment will be described with reference to FIG. 1 to FIG. 4. In the liquid crystal display device 1, the image signal processing section 41 controls, to the input image signal Din, the output order (writing order) of the right-eye image signal DR and the left-eye image signal DL, to generate the image signal D1 which is then outputted to the dithering processing section 42. The dithering processing section 42 applies, to the image signal D1, the dithering process utilizing the predetermined masks and the chromaticity adjusting process, to generate the image signal D2. The thus-generated image signal D2 is then supplied to the data driver 51 via the timing controlling section 51.

The data driver 51 applies the D/A conversion to the image signal D2, to generate the image voltage as the analog signal. Then, the line-sequential display driving operation is performed based on the driving voltage outputted from the gate driver 52 and the data driver 51 to each of the pixels 20.

More specifically, the TFT element 21 is turned ON or OFF in accordance with a selection signal supplied from the gate driver 52 via the gate line G. Thereby, the data line D and the liquid crystal element 22 as well as the auxiliary capacitor 23 are electrically connected, selectively. As a result, the image voltage based on the image signal D2 is supplied to the liquid crystal element 22, and thus the display driving operation is performed. That is, an illumination light from the backlight 3 is modulated in the pixel 20, and the thus-modulated illumination light exits therefrom as a display light. In this manner, the right-eye image and the left-eye image, which are based on the input image signal Din (i.e., the right-eye image signal DR and the left-eye image signal DL), are alternately displayed in the time-divisional fashion (i.e., the time-division driving is performed).

On the other hand, the shutter controlling section 43 outputs, to the shutter eyeglasses 6, the control signal CTL of the shutters which is in synchronization with the displaying timing of the left-eye image and the right-eye image, in accordance with the timing control by the image signal controlling section 41.

Figure 3A:
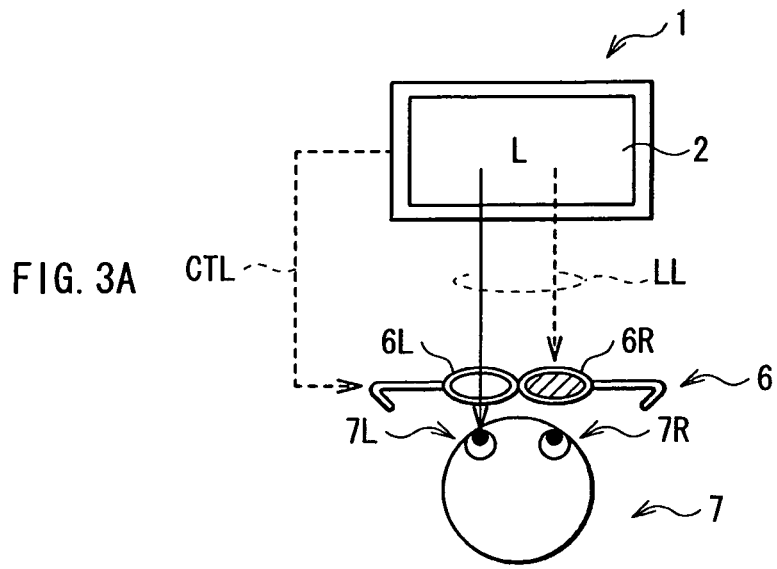
FIG. 3A and FIG. 3B are schematic diagrams for describing a stereoscopic image displaying operation in the image displaying system illustrated in FIG. 1.
Figure 3B:
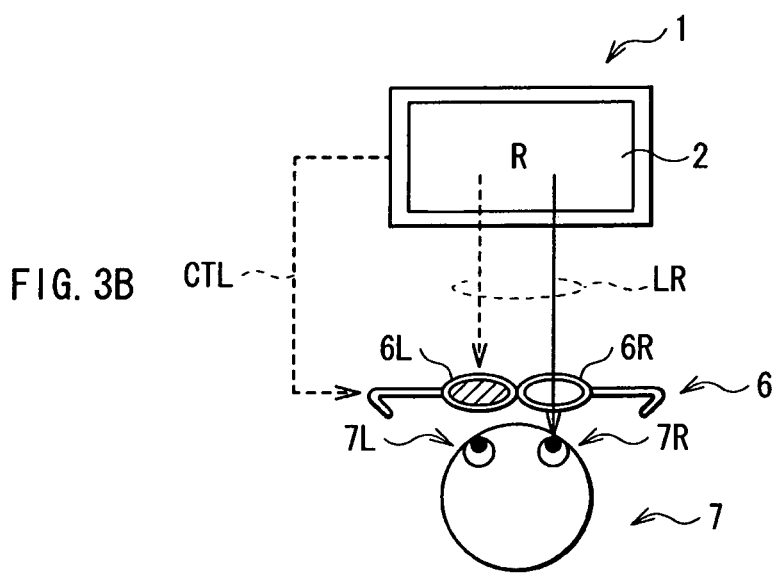

As illustrated in FIG. 3A, the shutter eyeglasses 6 are so controlled that, when performing the image displaying for the left eye, the display light LL based on the left-eye image transmits only the left-eye shutter 6L, by allowing the left-eye shutter 6L in the shutter eyeglasses 6 used by the viewer 7 to be in the opened state while allowing the right-eye shutter 6R to be in the closed state, based on the control signal CTL. On the other hand, when performing the image displaying for the right eye, the shutter eyeglasses 6 are so controlled, based on the control signal CTL, that the display light LR based on the right-eye image transmits only the right-eye shutter 6R, by allowing the right-eye shutter 6R to be in the opened state while allowing the left-eye shutter 6L to be in the closed state, as illustrated in FIG. 3B.

The above-described image displaying for the right eye and the left eye performed in the liquid crystal display device 1, and the above-described opening-closing operation performed in the shutter eyeglasses 6, are repeated alternately in the time-divisional fashion, respectively. The viewer 7 sees the left-eye image with the left eye 7L and sees the right-eye image with the right eye 7R, by viewing a display screen of the liquid crystal display device 1 by wearing the shutter eyeglasses 6. Since there is a parallax between the left-eye image and the right-eye image, the viewer 7 recognizes those images as the stereoscopic image having depth.

Figure 4:
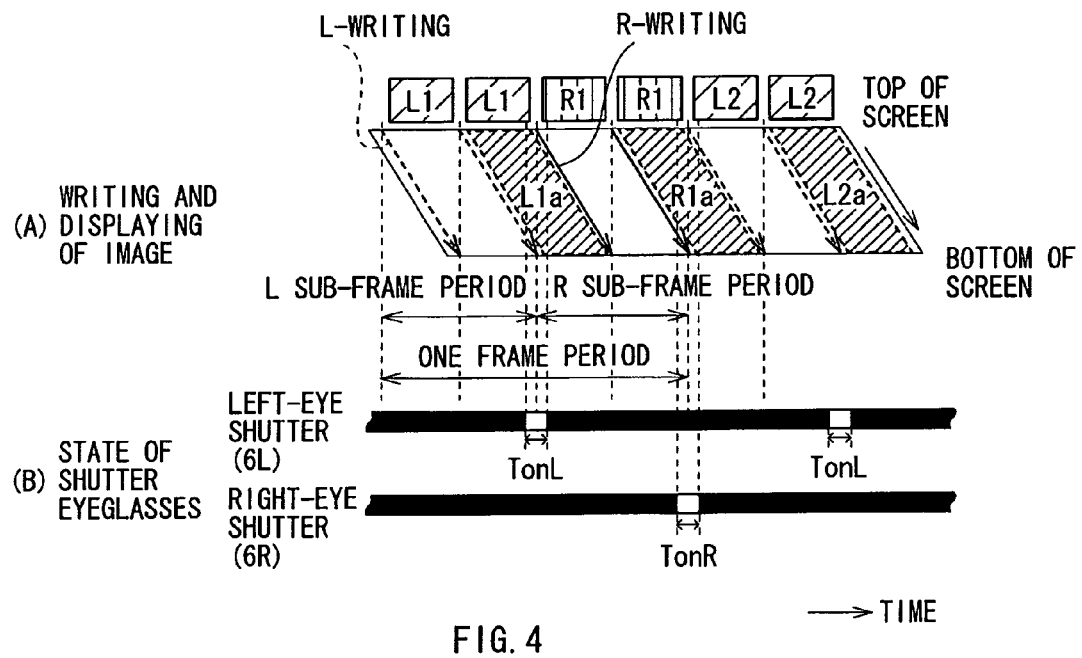
FIG. 4 is a timing chart illustrating an outline of the stereoscopic image displaying operation in the image displaying system illustrated in FIG. 1.

Now, a temporal correspondence relationship between the above-described writing-displaying operation of the images in the liquid crystal display device 1 and the above-described opening-closing operation of the shutter eyeglasses 6 will be described in detail with reference to FIG. 4. Part (A) of FIG. 4 illustrates a timing of the writing-displaying operation of the images, whereas Part (B) illustrates a timing of the opened state and the closed state of the shutter eyeglasses 6 (i.e., the left-eye shutter 6L and the right-eye shutter 6R). In Part (A) of FIG. 4, an arrow with a solid line represents the timing of writing of the right-eye image signal (R-writing), and an arrow with a broken line represents the timing of writing of the left-eye image signal (L-writing). In Part (B) of FIG. 4, a period in which the left-eye shutter 6L is closed and a period in which the right-eye shutter 6R is closed are each represented in black. Also, a period in which the left-eye shutter 6L is open (TonL) and a period in which the right-eye shutter 6R is open (TonR) are each represented in white.

As illustrated in Part (A) of FIG. 4, in the liquid crystal display device 1, the same left-eye image signal is written to the liquid crystal display panel 2 successively twice in L-sub frame periods within one frame period. Thereby, a desired gradation-level luminance is held in the entire screen, during a period (L1a, L2a, etc.) from completion of the second writing of the left-eye image signal to completion of writing of a subsequent image signal (i.e., first writing of the right-eye image signal). That is, the left-eye images L1, L2, etc., are displayed on the display screen in the periods L1a, L2a, etc. Likewise, the same right-eye image signal is written in R-sub frame periods within one frame period. Thereby, a desired gradation-level luminance is held in the entire screen, during a period (R1a etc.) from completion of the second writing of the right-eye image signal to completion of writing of a subsequent image signal (i.e., first writing of the left-eye image signal). That is, the right-eye images R1, R2, etc., are displayed on the display screen in the periods R1a, etc.

On the other hand, in the shutter eyeglasses 6, the opened period TonL of the left-eye shutter 6L is set corresponding to the periods L1a, L2a, etc., and the opened period TonR of the right-eye shutter 6R is set corresponding to the periods R1a etc., as illustrated in Part (B) of FIG. 4.

[2. Operation of Dithering Process]

Now, an operation of the dithering process and the chromaticity adjusting process in the dithering processing section 42 will be described. The dithering processing section 42 performs the process of enhancing the gradation level of the left-eye image and the right-eye image, which are used for the stereoscopic image displaying described above, to generate the image signal D2. In the present embodiment, the dithering processing section 42 further performs the chromaticity adjusting process on the image signal D2 applied with the gradation-level extension.

2-1. Comparative Example

Figure 5:
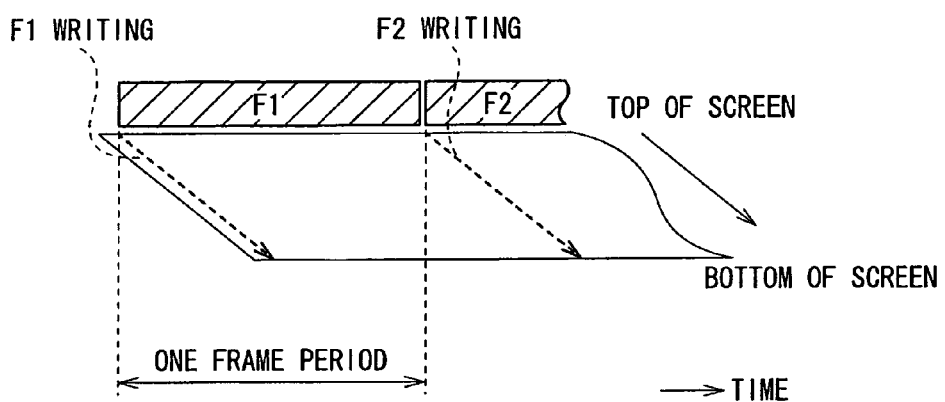
FIG. 5 is a timing chart illustrating an outline of a two-dimensional image displaying operation according to a comparative example.
Figure 6:
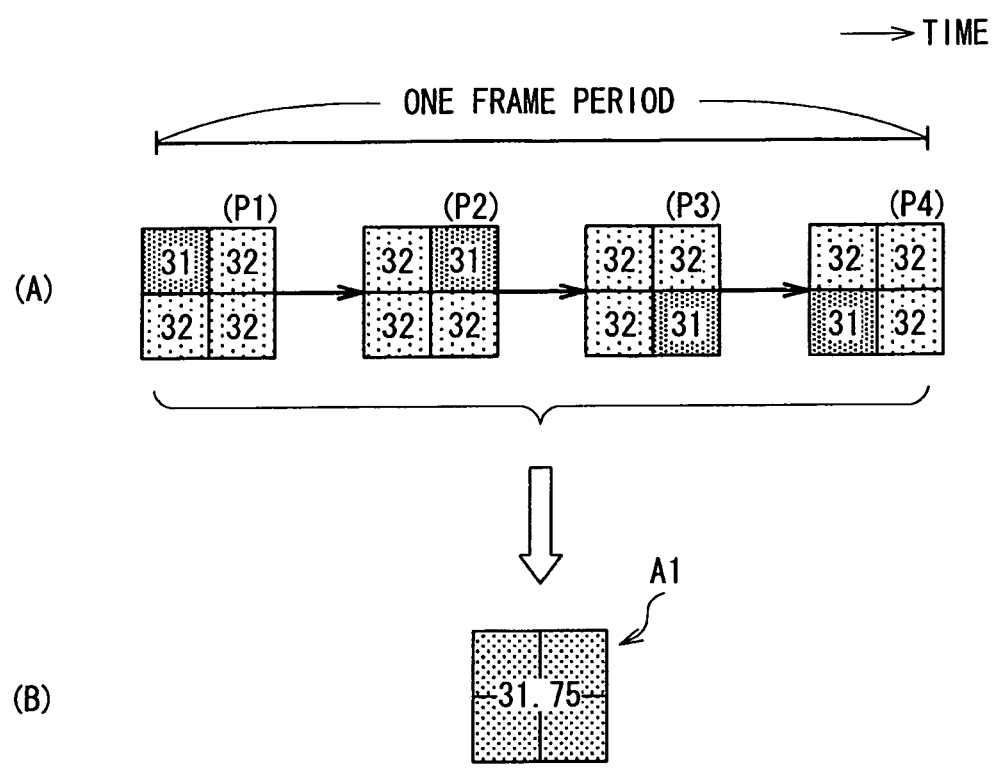
FIG. 6 is a schematic diagram for describing an operation of a dithering process according to the comparative example illustrated in FIG. 5.
Figure 7:
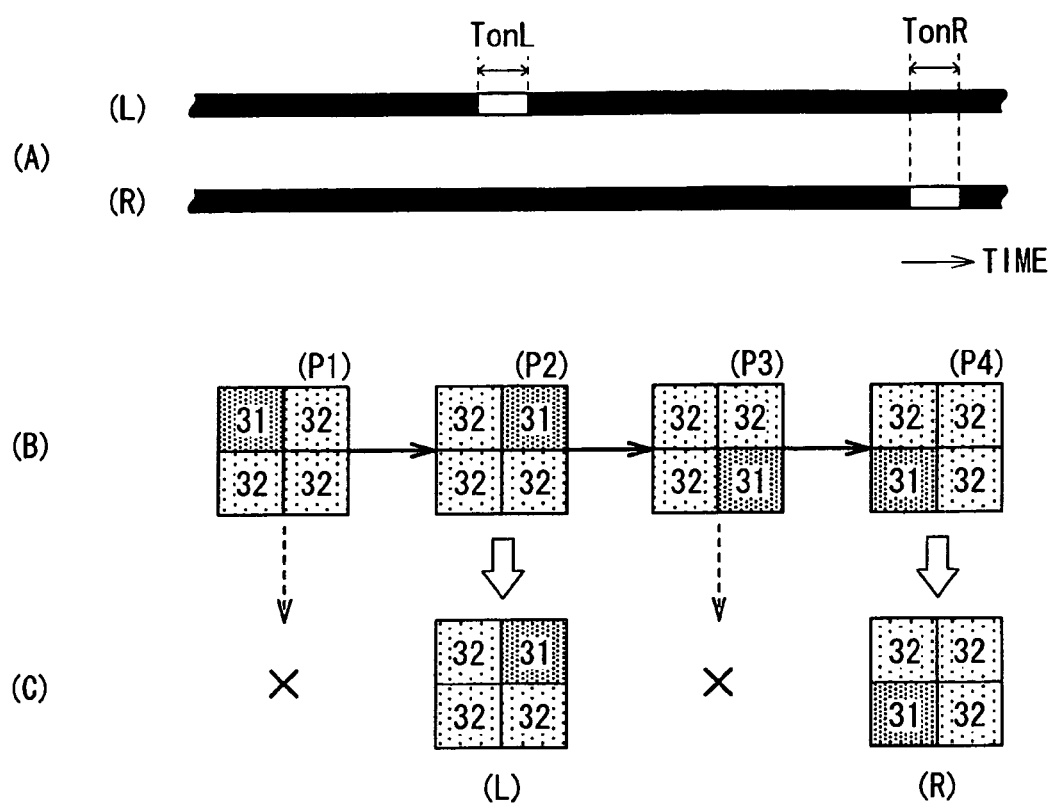
FIG. 7 is a schematic diagram for describing a drawback when the dithering process according to the comparative example is applied to stereoscopic image displaying.

First, as a comparative example of the present embodiment, a dithering process in an example of a two-dimensional image displaying will be described with reference to FIG. 5 to FIG. 7. FIG. 5 is a timing chart for describing an outline of operation of the two-dimensional image displaying according to the comparative example. Each arrow with a broken line in FIG. 5 represents a timing of writing of an image signal. FIG. 6 is a timing diagram for describing the dithering process according to the comparative example. FIG. 7 is an explanatory diagram for describing a drawback when the dithering process according to the comparative example is applied directly to a stereoscopic image displaying.

Referring to FIG. 5, when displaying a two-dimensional image, the image signal is written in one frame period in a once-by-once fashion (F1 writing and F2 writing), to display images F1, F2, etc. on a screen. The thus-displayed image is seen by a viewer without using shutter eyeglasses, and is recognized by the user as the two-dimensional image.

The dithering process in the example of the two-dimensional image displaying is performed as follows. For example, as illustrated in Part (A) of FIG. 6, a plurality of masks are switched over in a time-divisional fashion. The masks used here each have two or more kinds of gradation values arranged in a predetermined pattern in m-by-n matrix regions, such as those described above. More specifically, the description will be made here with reference to the example, where four masks, each having a 31 gradation value and a 32 gradation value arranged in a mutually-different pattern (P1 to P4) in 2-by-2 regions, are used. Each of the patterns P1 to P4 disposes the 31 gradation value in one region of the 2-by-2 regions, and disposes the 32 gradation value in other three regions. Among these regions, a position of the 31 gradation value is different for each of the patterns P1 to P4. For example, the 31 gradation value and the 32 gradation value are so disposed that the position of the 31 gradation value is located at the upper left in the pattern P1, at the upper right in the pattern P2, at the lower right in the pattern P3, and at the lower left in the pattern P4.

These patterns P1 to P4 of the masks are time-divisionally switched over within one frame period. Thereby, the two kinds of gradation values disposed in each of the masks are temporally and spatially averaged, and thus a halftone thereof is represented. In this example, 31.75 gradation value is represented within the entire one frame period (denoted by "A1" in Part (B) of FIG. 6). This makes it possible to enhance a gradation representation by 2 bits, for example.

However, when the above-described dithering process utilizing the masks is applied directly to the stereoscopic image displaying, the following drawback occurs. In the operation of the stereoscopic image displaying, the left-eye shutter 6L is allowed to be in the opened state only in the displaying period of the left-eye image (L1a), and the right-eye shutter 6R is allowed to be in the opened state only in the displaying period of the right-eye image (R1a), both of which are within one frame period, as described above. Thus, when the patterns P1 to P4 are switched over as in the two-dimensional image displaying as illustrated in Part (A) to Part (C) of FIG. 7, a part of the patterns of the masks is interrupted or blocked by the closing operation in the left-eye shutter 6L and the right-eye shutter 6R. For example, the pattern P1 and the pattern P3 among the patterns P1 to P4 are interrupted by the left-eye shutter 6L or by the right-eye shutter 6R, and as a result, the pattern P2 is visually recognized by the left-eye directly or "as it is", and the pattern P4 is visually recognized by the right eye as it is. This does not make the respective gradation values disposed on the masks to be averaged both temporally and spatially, and results in a generation of deterioration factors such as roughness and flicker in a displayed image.

2-2. Dithering Process of the Present Embodiment

Figure 8:
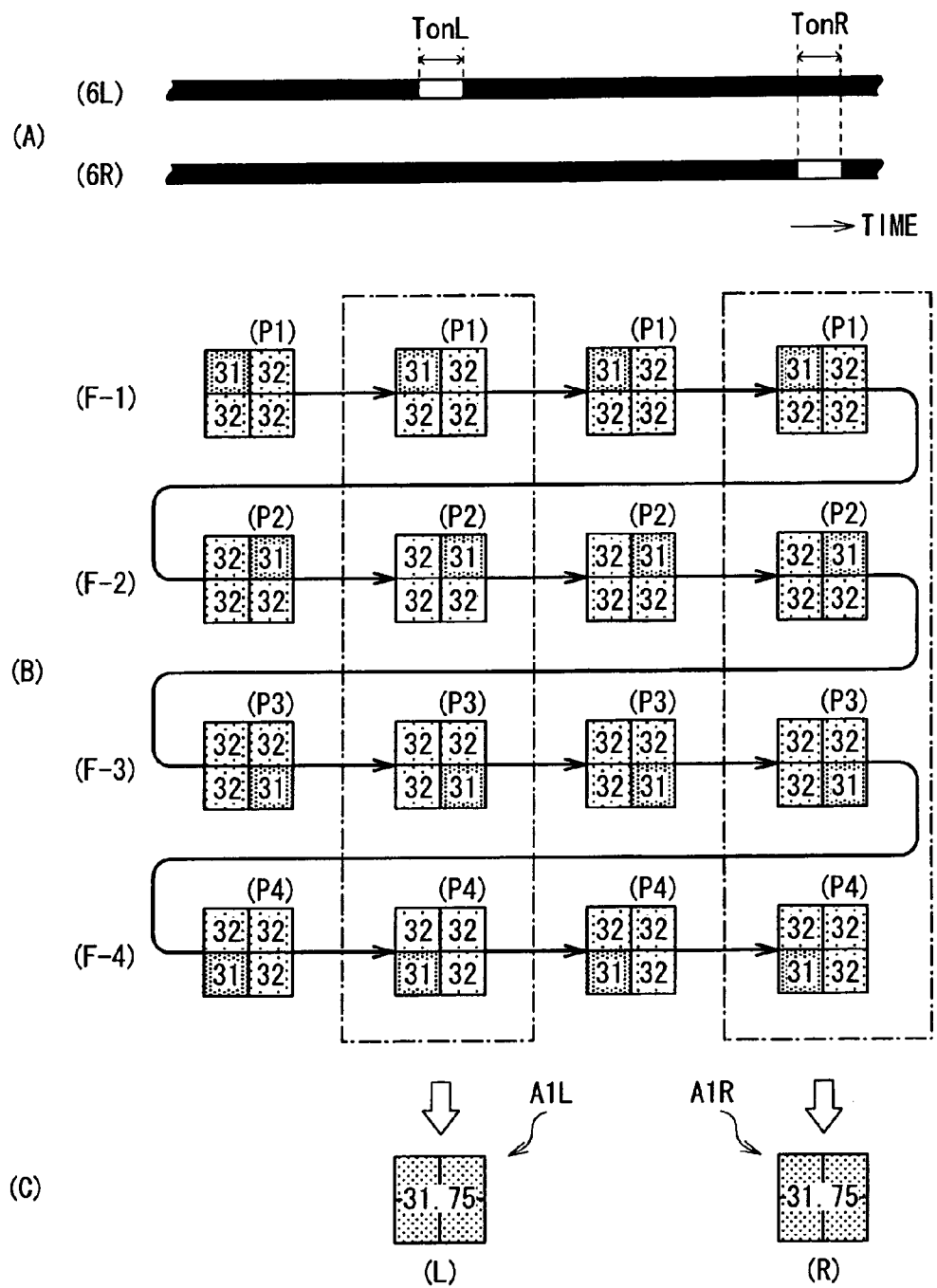
FIG. 8 is a schematic diagram for describing an operation of a dithering process in a dithering processing section illustrated in FIG. 1.

Therefore, in the present embodiment, the following dithering process is performed. FIG. 8 is a timing diagram for describing an outline of the operation of the dithering process in the dithering processing section 42. Part (A) of FIG. 8 illustrates the opening-closing state of the left-eye shutter 6L and that of the right-eye shutter 6R in the shutter eyeglasses 6. Part (B) of FIG. 8 illustrates the timing of changing over the mask patterns in consecutive four unit-frame periods (F-1 to F-4). As in the comparative example described above, the description will be given with reference to the example, where the four masks having the patterns P1 to P4, which dispose the 31 gradation value and the 32 gradation value in the 2-by-2 regions at the ratio of 1:3, and which dispose the 31 gradation value at the upper left, the upper right, the lower right, and the lower left, respectively, are used.

Referring to Part (B) of FIG. 8, the dithering processing section 42 performs a control of changing over the masks for every unit-frame period. In other words, the dithering processing section 42 continuously uses the pattern P1 in a certain frame period F-1, and performs the changing over of the patterns from the pattern P1 to the pattern P2 in synchronization with the timing of changing over to the subsequent frame period F-2. Likewise, the dithering processing section 42 performs the changing over to the pattern P3 in synchronization with the timing of changing over to the frame period F-3, and performs the changing over to the pattern P4 in synchronization with the timing of changing over to the frame period F-4. These changing over of the masks may be performed when the left-eye shutter 6L and the right-eye shutter 6R are in the closed period, or may be performed during a blanking period. This makes it possible to allow the viewer to have a visual contact with all of the patterns P1 to P4 of the masks in the opened period TonL of the left-eye shutter 6L and in the opened period TonR of the right-eye shutter 6R, in an order of the pattern P1, the pattern P2, the pattern P3, and the pattern P4, for example.

As described above, the patterns P1 to P4 are sequentially switched over for every unit-frame period. This makes it possible to allow the viewer to have a visual contact with all of the patterns continuously in four frame periods, which are the same number as the number of the mask patterns, for both of the left eye and the right eye, even when the shutter eyeglasses 6, configured to be in the open state only in a certain period of time within one frame period, are used, that is, even when performing the stereoscopic image displaying. Thereby, the two types of gradation values disposed for each of the masks are temporally and spatially averaged, and thus a pseudo halftone thereof is represented. In other words, the gradation levels of a plane as a whole (i.e., a 2-by-2 pixel region) of each of the masks, and the gradation levels for respective pixels in all of the mask patterns, are respectively averaged. In the present embodiment, since the 31 gradation value and the 32 gradation value are disposed at the ratio of 1:3 both temporally and spatially, it is possible to represent the 31.75 gradation value in the 2-by-2 pixel region for both of the left eye and the right eye (denoted by A1L and A1R in Part (C) of FIG. 8). Such a dithering process according to the present embodiment enables to represent the pseudo halftone having 256 gradation levels when the image signal D1 is represented with the 256 gradation levels (8 bits), for example. As a result, a gradation representation having 1024 gradation levels (10 bits), which is enhanced by 2 bits, is possible in the image signal D2 written to the liquid crystal display panel 2. Incidentally, since the 2-by-2 pixel region is represented by one gradation level (31.75 gradation value), one may concern a deterioration in resolution. However, the deterioration in the resolution is hardly recognized by the viewer since, in fact, the displaying is so performed that the respective gradation values are time-divisionally switched over for the respective pixels.

2-3. Chromaticity Adjusting Process

Figure 9:
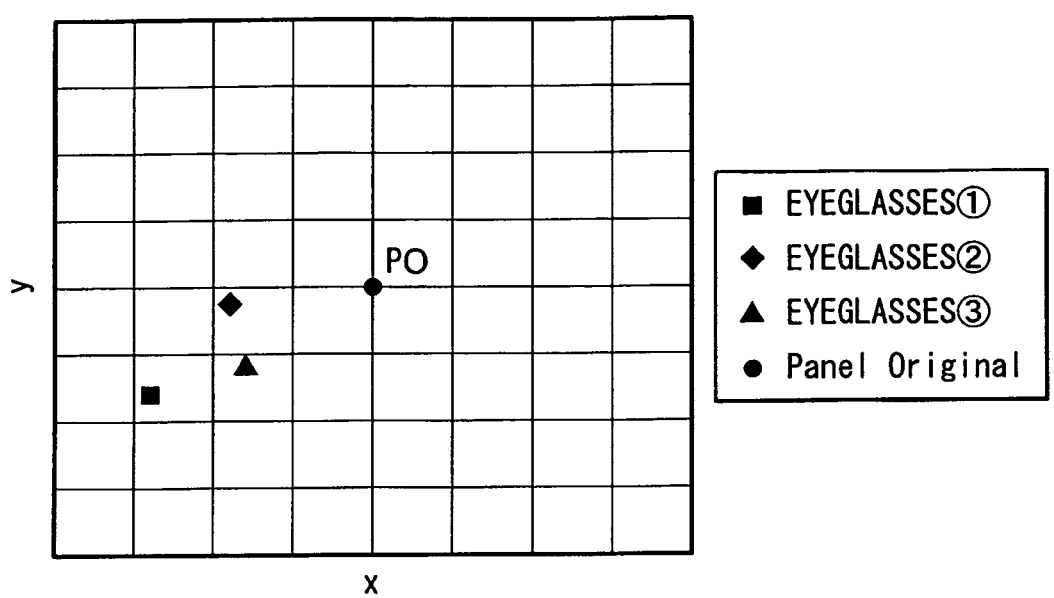
FIG. 9 illustrates a relationship between kinds of shutter eyeglasses and chromaticity (in x, y).

The dithering processing section 42 also performs the chromaticity adjusting process on the image signal D2 applied with the dithering process described above. That is, in the present embodiment, the dithering processing section 42 performs the chromaticity adjusting process utilizing the above-described dithering process. FIG. 9 illustrates a relationship between the shutter eyeglasses (eyeglasses 1 to 3) and a chromaticity coordinate (in x, y). A coordinate P0 in FIG. 9 is a chromaticity coordinate of an image itself displayed on a display screen when the shutter eyeglasses are not used. The eyeglasses 1 to 3 are different one another, in terms of respective driving modes of liquid crystals thereof, for example. As can be seen from FIG. 9, a shift or "deviation" occurs in the chromaticity when the shutter eyeglasses are used, and a degree of the chromaticity deviation also differs depending on the kinds of the shutter eyeglasses due to a difference in characteristics among them.

Accordingly, the dithering processing section 42 holds the chromaticity adjusting parameters, which are prepared beforehand and are different one another for the respective kinds of the shutter eyeglasses. Further, the dithering processing section 42, when performing the chromaticity adjustment, selects the chromaticity adjusting parameter which corresponds to the kind of the shutter eyeglasses 6 used by the viewer, and performs the adjustment or representation utilizing the selected chromaticity adjusting parameter. In performing the chromaticity adjustment, the dithering processing section 42 utilizes, for example, the look-up table (LUT) 44 used for the chromaticity adjustment illustrated in FIG. 10. FIG. 10 represents gradation values of respective colors of R, G, and B following the chromaticity adjustment in respective cases where the eyeglasses 1 and 3 (each of which causes the chromaticity deviation represented in FIG. 9) are used, relative to respective gradation values of R, G, and B of an image displayed on the display screen of the liquid crystal display panel 2 in a case where the eyeglasses are not used.

Unlike the two-dimensional image displaying, the chromaticity deviation occurs in the image viewed via the shutter eyeglasses 6 in the stereoscopic image displaying system utilizing the shutter eyeglasses 6. Thus, it is preferable that the chromaticity adjusting process be performed in the stereoscopic image displaying system utilizing the shutter eyeglasses 6. Incidentally, a chromaticity adjustment may sometimes be performed in the two-dimensional image displaying by using parameters corresponding to a color temperature. In the stereoscopic image displaying system, on the other hand, an extent of the chromaticity deviation differs depending on the kinds of the shutter eyeglasses. Thus, it is more preferable that the chromaticity adjusting parameters corresponding to the kinds of the shutter eyeglasses be used. As described above, the chromaticity adjusting process is performed on the image signal D2 having the gradation level enhanced by the dithering process. Hence, it is possible to achieve the chromaticity adjustment with good accuracy.

Accordingly, in the present embodiment of the invention, the dithering processing section 42 so controls the four masks, in which, for example, the 31 gradation value and the 32 gradation value are two-dimensionally arranged in the patterns P1 to P4, respectively, that all of those masks are sequentially switched over in the respective opened periods of the left-eye shutter 6L and the right-eye shutter 6R of the shutter eyeglasses 6. In other words, the dithering processing section 42 so controls the plurality of masks, each of which has the pattern of two-dimensionally-arranged gradation-level values 31 and 32 and in which the pattern differs from the pattern of another mask, that the plurality of masks are sequentially and cyclically switched in synchronization with the shutter open timings for each of left-eye shutter 6L and the right-eye shutter 6R of the shutter eyeglasses 6, to perform the dithering process. That is, the dithering processing section 42 sequentially switches over the patterns P1 to P4 for every unit-frame period, i.e., the dithering processing section 42 controls the dithering process in such a manner that switching of the masks is not executed within the unit-frame period and is executed for every unit-frame period. This makes it possible to spatially and temporally average the respective gradation values disposed in the masks for each of the opened period TonL of the left-eye shutter 6L and the opened period TonR of the right-eye shutter 6R, and to represent the halftone thereof (the 31.75 gradation value in the present embodiment). Therefore, it is possible to enhance the gradation representation while suppressing deterioration such as the roughness and the flicker in the displayed image, in the stereoscopic image displaying system utilizing the time-division driving system.

Hereinafter, a first modification to a fifth modification of the embodiment of the invention will be described. Note that the same or equivalent elements as those of stereoscopic image displaying system according to the embodiment described above are denoted with the same reference numerals, and will not be described in detail.

Figure 11:
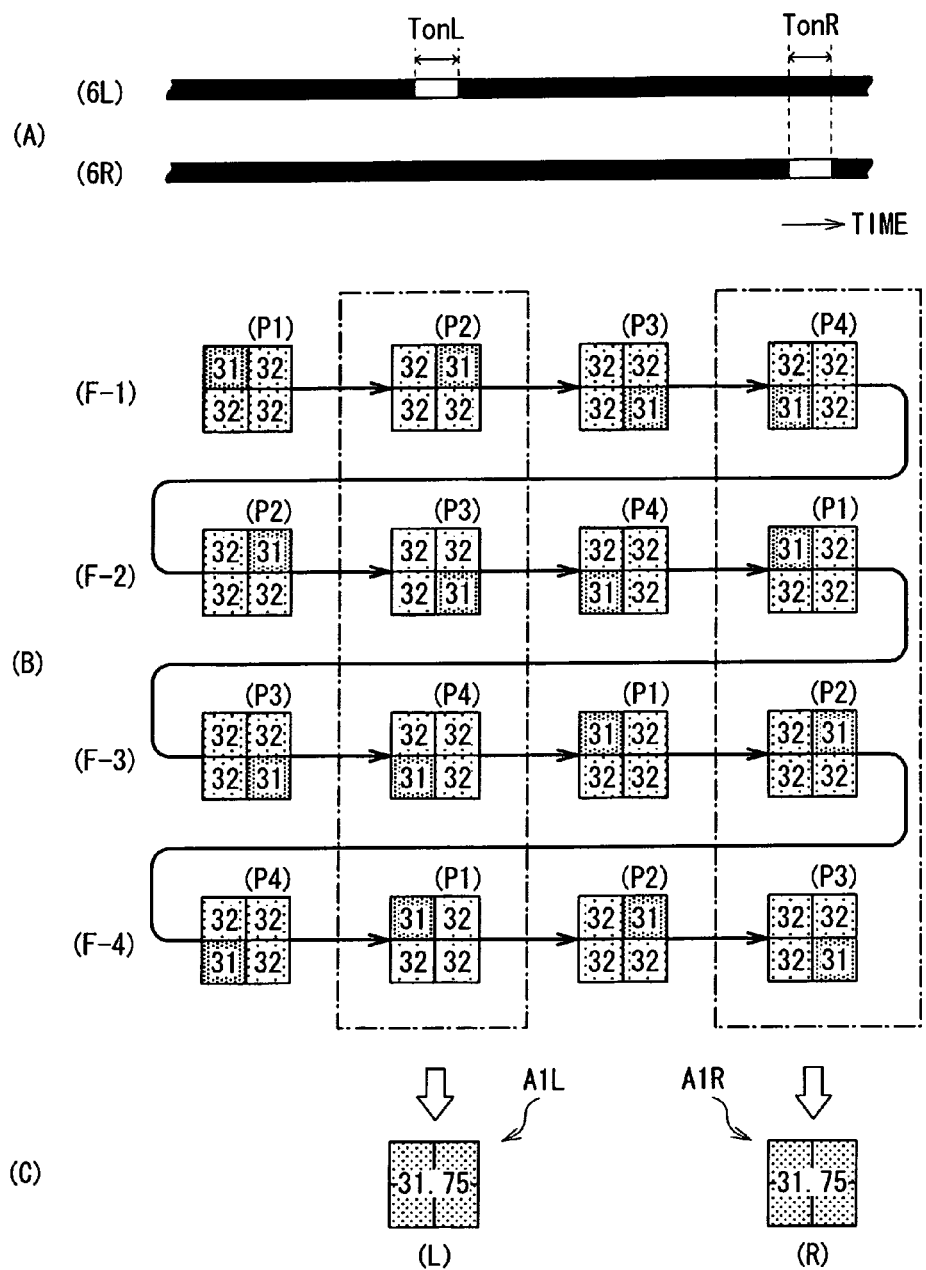
FIG. 11 is a schematic diagram for describing an operation of a dithering process according to a first modification.

FIG. 11 is a timing diagram for describing an outline of an operation of a dithering process according to the first modification. Part (A) of FIG. 11 illustrates the opening-closing state of the left-eye shutter 6L and that of the right-eye shutter 6R in the shutter eyeglasses 6. Part (B) of FIG. 11 illustrates the timing of changing over the mask patterns in the consecutive four unit-frame periods (F-1 to F-4). The first modification has the same structures for the respective sections etc. and the operations as those of the embodiment described above, except that only the operation of the dithering process in the dithering processing section 42 differs from the image displaying system of the embodiment described above.

More specifically, the operation of the dithering process according to the present modification differs from that in the embodiment described above, in terms of the timing of changing over the mask patterns. That is, in the present modification, the dithering processing section 42 performs a control such that, for example, the patterns P1 to P4 are sequentially switched over in the unit-frame periods, and that an order of the switching over differs for every unit-frame period. For example, as illustrated in Part (B) of FIG. 11, the dithering processing section 42 switches over the mask patterns in an order of the pattern P1, the pattern P2, the pattern P3, and the pattern P4 in a certain frame period F-1, and switches over the mask patterns in an order of the pattern P2, the pattern P3, the pattern P4, and the pattern P1 in the subsequent frame period F-2. Likewise, the dithering processing section 42 switches over the mask patterns in an order of the pattern P3, the pattern P4, the pattern P1, and the pattern P2 in the subsequent frame period F-3, and switches over the mask patterns in an order of the pattern P4, the pattern P1, the pattern P2, and the pattern P3 in the subsequent frame period F-4.

This makes it possible to allow the viewer to have a visual contact with all of the patterns P1 to P4 of the masks, in an order of the pattern P2, the pattern P3, the pattern P4, and the pattern P1 in the opened period TonL of the left-eye shutter 6L, for example, and to allow the viewer to have a visual contact with all of the patterns P1 to P4 of the masks, in an order of the pattern P4, the pattern P1, the pattern P2, and the pattern P3 in the opened period TonR of the right-eye shutter 6R, for example.

In the present modification, the patterns P1 to P4 are sequentially switched over in the different order for every unit-frame period. This makes it possible to allow the viewer to have a visual contact with all of the patterns continuously in four frame periods, which are the same number as the number of the mask patterns, for both of the left eye and the right eye, even when performing the stereoscopic image displaying. Thereby, as in the embodiment described above, the two types of gradation values disposed for each of the masks are temporally and spatially averaged, and thus a pseudo halftone thereof is represented (in the present embodiment, 31.75 gradation value, as denoted by A1L and A1R in Part (C) of FIG. 11). Therefore, it is possible to obtain an effect equivalent to that of the embodiment described above.

In the embodiment described above and the first modification, although the dithering processing section 42, when performing the twice writing, uses the masks throughout the entire one frame period (that is, the dithering processing section 42 uses the masks even during when the right-eye shutter 6R and the left-eye shutter 6L are in the closed state), the dithering processing section 42 may perform a control such that the masks are used only in each of the opened periods of the right-eye shutter 6R and the left-eye shutter 6L.

[Second Modification]

Figure 12:
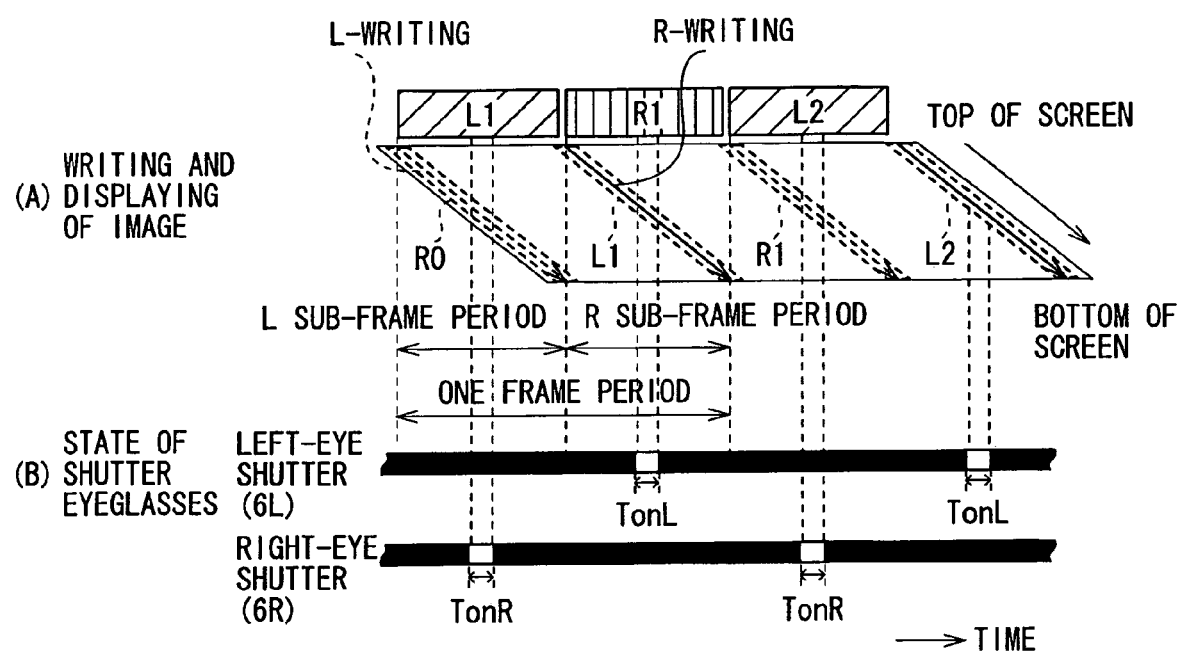
FIG. 12 is a timing chart illustrating an outline of a stereoscopic image displaying operation according to a second modification.

FIG. 12 is a timing chart illustrating an outline of a stereoscopic image displaying operation of a stereoscopic image displaying system according to the second modification. Part (A) of FIG. 12 illustrates a timing of the writing-displaying operation of the images, whereas Part (B) illustrates a timing of the opened state and the closed state of the shutter eyeglasses 6 (i.e., the left-eye shutter 6L and the right-eye shutter 6R). In Part (A) of FIG. 12, an arrow with a solid line represents the timing of writing of the right-eye image signal (R-writing), and an arrow with a broken line represents the timing of writing of the left-eye image signal (L-writing). In Part (B) of FIG. 12, a period in which the left-eye shutter 6L is closed and a period in which the right-eye shutter 6R is closed are each represented in black. Also, a period in which the left-eye shutter 6L is open (TonL) and a period in which the right-eye shutter 6R is open (TonR) are each represented in white.

In the present modification, in the liquid crystal display device 1, the left-eye image signal is written to the liquid crystal display panel 2 once in the L-sub frame period within one frame period, and the right-eye image signal is written to the liquid crystal display panel 2 once in the R-sub frame period within the one frame period, as illustrated in Part (A) of FIG. 12 (in this embodiment, the period in which the left-eye image signal DL is outputted (written) once in one frame period is referred to as "L sub-frame period", and the period in which the right-eye image signal DR is outputted (written) once in one frame period is referred to as "R sub-frame period"). On the other hand, in the shutter eyeglasses 6, the opened period TonL of the left-eye shutter 6L is set during a period from completion of the L-writing to completion of the R-writing, and the opened period TonR of the right-eye shutter 6R is set during a period from completion of the R-writing to completion of the L-writing, as illustrated in Part (B) of FIG. 12.

Figure 13:
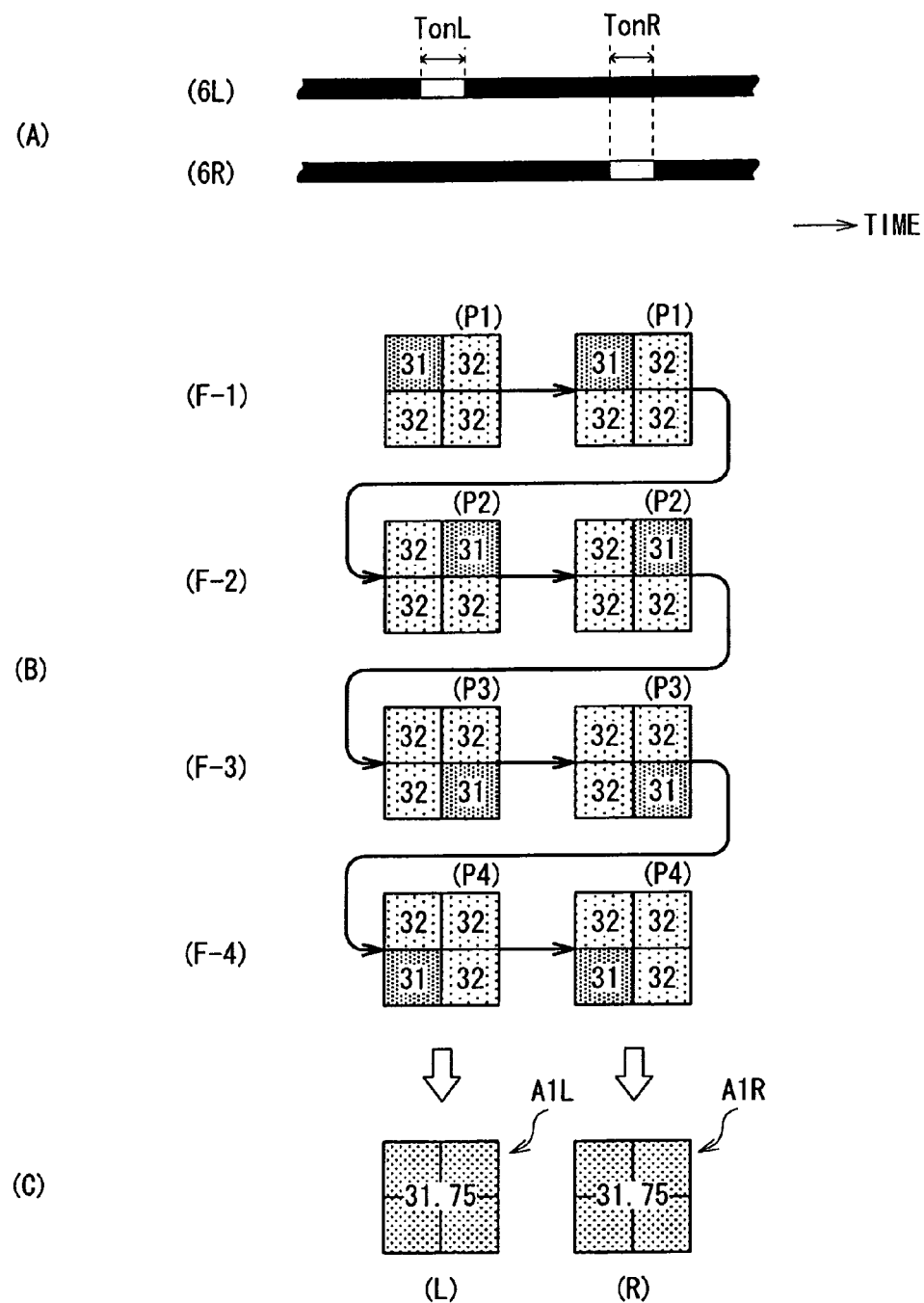
FIG. 13 is a schematic diagram for describing an operation of a dithering process according to the second modification.

When performing the stereoscopic image displaying based on the once-writing described above, the operation of the dithering process in the dithering processing section 42 is performed as follows. FIG. 13 is a timing diagram for describing an outline of the dithering process operation according to the second modification. Part (A) of FIG. 13 illustrates the opening-closing state of the left-eye shutter 6L and that of the right-eye shutter 6R in the shutter eyeglasses 6. Part (B) of FIG. 13 illustrates the timing of changing over the mask patterns in consecutive four unit-frame periods (F-1 to F-4). As in the embodiment described above, the description will be given with reference to the example, where the four masks having the patterns P1 to P4, which dispose the 31 gradation value and the 32 gradation value in the 2-by-2 regions at the ratio of 1:3, and which dispose the gradation value at the upper left, the upper right, the lower right, and the lower left, respectively, are used.

Referring to Part (B) of FIG. 13, the dithering processing section 42 performs the control of changing over the masks for every unit-frame period, as in the embodiment described above. In other words, the dithering processing section 42 continuously uses the pattern P1 in a certain frame period F-1, and performs the changing over of the patterns from the pattern P1 to the pattern P2 in synchronization with the timing of changing over to the subsequent frame period F-2. Likewise, the dithering processing section 42 performs the changing over to the pattern P3 in synchronization with the timing of changing over to the frame period F-3, and performs the changing over to the pattern P4 in synchronization with the timing of changing over to the frame period F-4. This makes it possible to allow the viewer to have a visual contact with all of the patterns P1 to P4 of the masks in the opened period TonL of the left-eye shutter 6L and in the opened period TonR of the right-eye shutter 6R, in an order of the pattern P1, the pattern P2, the pattern P3, and the pattern P4, for example.

Accordingly, it is possible to allow the viewer to have a visual contact with all of the patterns continuously in four frame periods, which are the same number as the number of the mask patterns, for both of the left eye and the right eye, even when performing the stereoscopic image displaying based on the once-writing like in the present modification. Thereby, as in the embodiment described above, the two types of gradation values disposed for each of the masks are temporally and spatially averaged, and thus a pseudo halftone thereof is represented (in the present embodiment, 31.75 gradation value, as denoted by A1L and A1R in Part (C) of FIG. 13). Therefore, it is possible to obtain an effect equivalent to that of the embodiment described above.

[Third Modification]

Figure 14:
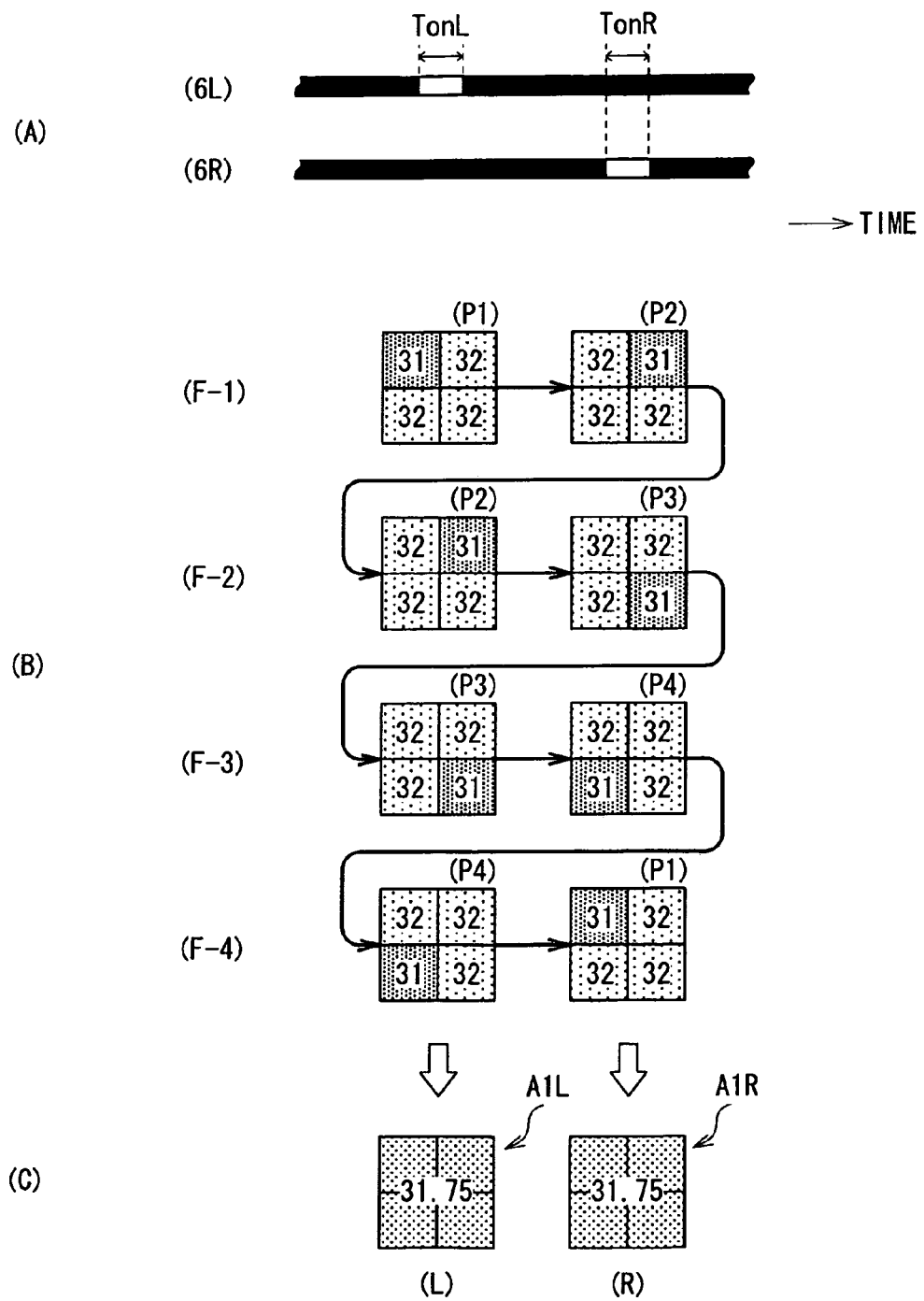
FIG. 14 is a schematic diagram for describing an operation of a dithering process according to a third modification.

FIG. 14 is a timing diagram for describing an outline of an operation of a dithering process according to the third modification. Part (A) of FIG. 14 illustrates the opening-closing state of the left-eye shutter 6L and that of the right-eye shutter 6R in the shutter eyeglasses 6. Part (B) of FIG. 14 illustrates the timing of changing over the mask patterns in the consecutive four unit-frame periods (F-1 to F-4). The third modification has the same structures for the respective sections etc. and the operations as those of the embodiment described above, except that only the operation of the dithering process in the dithering processing section 42 differs from the image displaying system of the embodiment described above.

The operation of the dithering process according to the present modification differs from that in the second modification described above, in terms of the timing of changing over the mask patterns. In the present modification, when performing the stereoscopic image displaying based on the once-writing of an image, the dithering processing section 42 performs a control such that, for example, the patterns P1 to P4 are switched over in an order which is different for every unit-frame period. For example, as illustrated in Part (B) of FIG. 14, the dithering processing section 42 switches over the mask patterns in an order of the pattern P1 and the pattern P2 in a certain frame period F-1, and switches over the mask patterns in an order of the pattern P2 and the pattern P3 in the subsequent frame period F-2. Likewise, the dithering processing section 42 switches over the mask patterns in an order of the pattern P3 and the pattern P4 in the subsequent frame period F-3, and switches over the mask patterns in an order of the pattern P4 and the pattern P1 in the subsequent frame period F-4. This makes it possible to allow the viewer to have a visual contact with all of the patterns P1 to P4 of the masks, in an order of the pattern P1, the pattern P2, the pattern P3, and the pattern P4 in the opened period TonL of the left-eye shutter 6L, for example, and to allow the viewer to have a visual contact with all of the patterns P1 to P4 of the masks, in an order of the pattern P2, the pattern P3, the pattern P4, and the pattern P1 in the opened period TonR of the right-eye shutter 6R, for example.

Accordingly, the patterns P1 to P4 are switched over in an order which is different for every unit-frame period. This makes it possible to allow the viewer to have a visual contact with all of the patterns continuously in four frame periods, which are the same number as the number of the mask patterns, for both of the left eye and the right eye, even in an example of the once-writing. Thereby, as in the embodiment described above, the two types of gradation values disposed for each of the masks are temporally and spatially averaged, and thus a pseudo halftone thereof is represented (in the present embodiment, 31.75 gradation value, as denoted by A1L and A1R in Part (C) of FIG. 14). Therefore, it is possible to obtain an effect equivalent to that of the embodiment described above.

[Fourth Modification]

Figure 15:
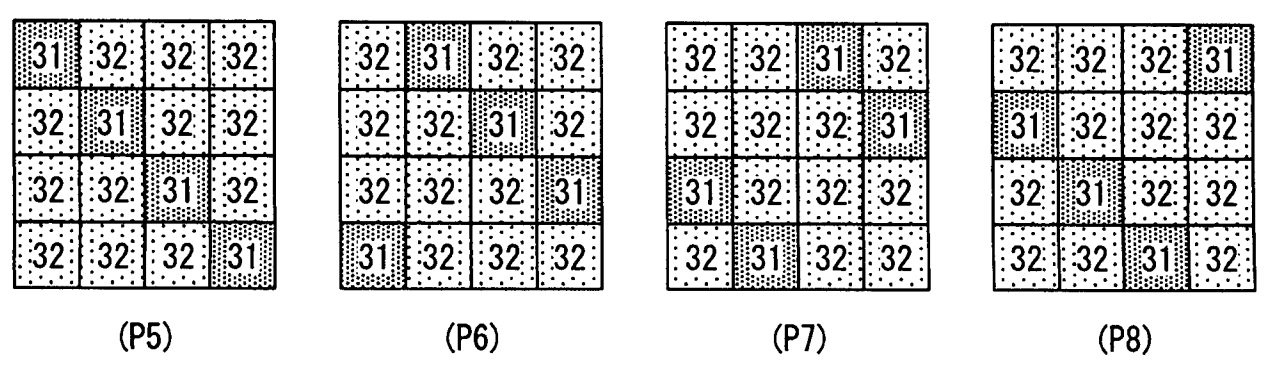

FIG. 15 illustrates patterns P5 to P8 of masks according to the fourth modification. The patterns P5 to P8 are used in the dithering processing section 42 of the image displaying system according to the embodiment described above. The respective patterns P5 to P8 dispose the 31 gradation value and the 32 gradation value at the ratio of 1:3 in mutually-different patterns, as in the patterns P1 to P4 of the masks in the embodiment described above. However, in the present modification, each of the patterns P5 to P8 has 4-by-4 matrix regions, and each of those regions is disposed with the 31 gradation value or the 32 gradation value. That is, in the present modification, the dithering process is performed on a 4-by-4 pixel region in an image, and the averaging of the gradation values is temporally and spatially performed for the 4-by-4 pixel region.

Accordingly, each of the mask patterns used for the dithering process may also have the 4-by-4 matrix as in the present modification, and even with the present modification, it is possible to obtain an effect equivalent to that of the embodiment described above. In other words, the mask patterns are not limited to the 2-by-2 patterns described in the foregoing.

In the embodiment described above and the modifications, the dithering process is performed by using the four masks each having the 31 gradation value and the 32 gradation value arranged at the ratio of 1:3. However, the number of masks, kinds of gradation values, the number of gradation values etc. used in the dithering process are not limited thereto. Also, in the embodiment described above and the modifications, the number of "m" and the number of "n" are equal to each other (i.e., 2-by-2 or 4-by-4) in the m-by-n mask patterns. However, "m" and "n" each may be an integer different from each other, as long as "m" by "n" is equal to or greater than two. In this case, the patterns are so set that an average of the gradation levels of a plane as a whole (i.e., an m-by-n pixel region) of each of the masks and an average of the gradation levels for respective pixels in all of the mask patterns each establish a desired halftone thereof. Also, it is preferable that each of the patterns be so set suitably that the pattern for each of the masks does not become conspicuous when the respective mask patterns are time-divisionally displayed, or that a motion of the patterns by the changing over of the masks is not seen.

[Fifth Modification]

Figure 16A:
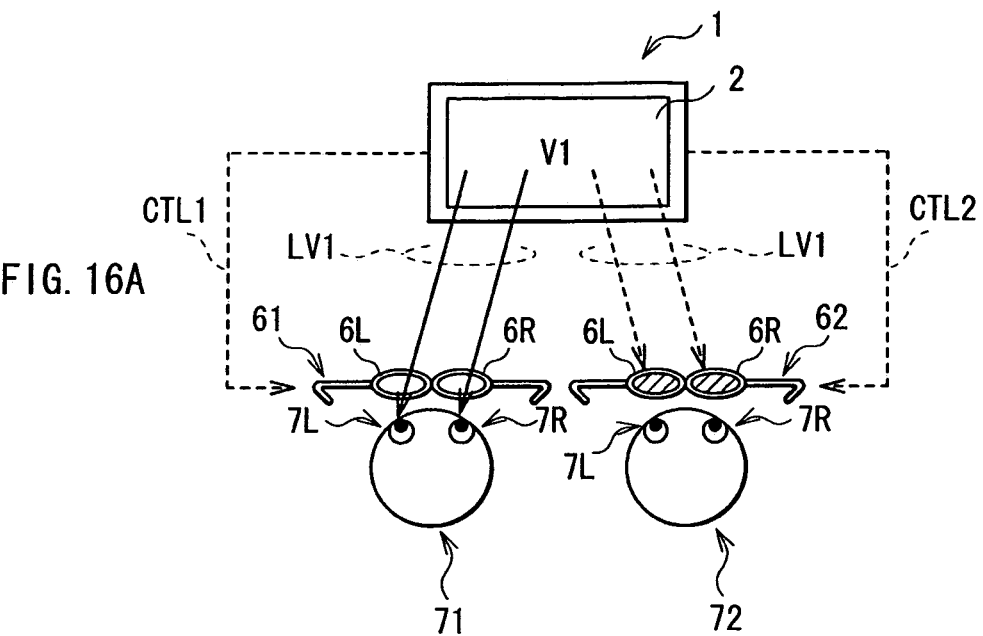
FIG. 16A and FIG. 16B are schematic diagrams for describing a multi-view system according to a fifth modification.
Figure 16B:
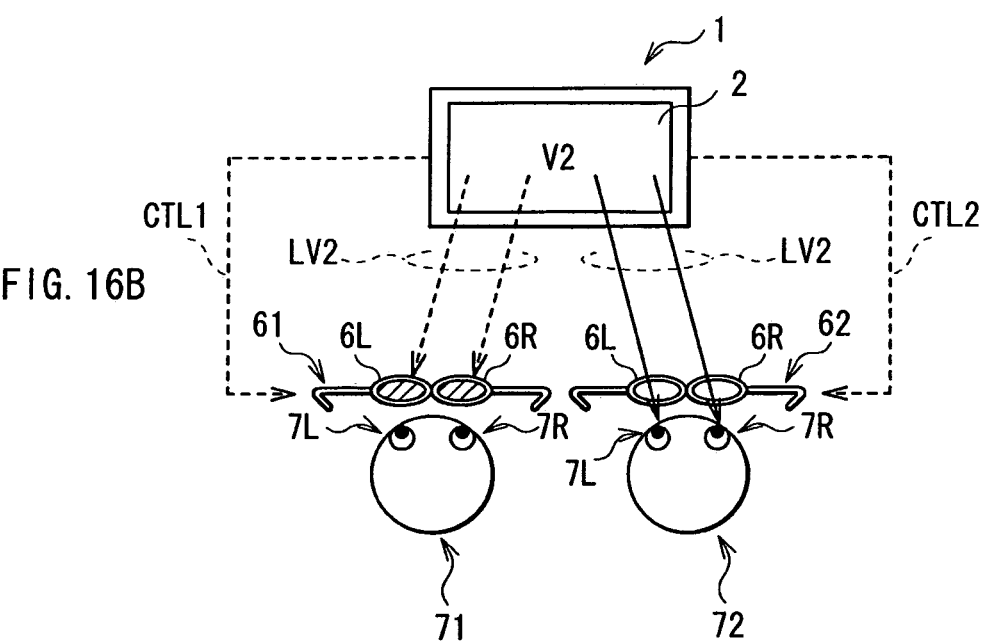

FIG. 16A and FIG. 16B are schematic diagrams for describing an outline of an image displaying operation of the image displaying system (a multi-view system) according to the fifth modification. In the present modification, a multi-image displaying operation, capable of separately displaying images which are mutually different (two images in the present modification) for a plurality of viewers (two viewers in the present modification), is performed instead of the stereoscopic image displaying operation described in the foregoing.

The multi-view system according to the present modification displays a first image based on a first image signal corresponding to a first viewer, and a second image based on a second image signal corresponding to a second viewer, alternately in a time-divisional fashion. That is, in the embodiment and the modifications described above, the left-eye image and the right-eye image corresponding to the left-eye shutter 6L and the right-eye shutter 6R in the shutter eyeglasses 6 are displayed, respectively. Whereas in the present modification, the plurality of images, each of which corresponds to the corresponding one of the viewers (i.e., users), are displayed.

More specifically, as illustrated in FIG. 16A, both of the right-eye shutter 6R and the left-eye shutter 6L in shutter eyeglasses 61 used by a viewer 71 are in the open state by a control signal CTL1, when a first image V1 is being displayed. Also, both of the right-eye shutter 6R and the left-eye shutter 6L in shutter eyeglasses 62 used by a viewer 72 are in the closed state by a control signal CTL2, when the first image V1 is being displayed. That is, a display light LV1 based on the first image V1 is allowed to transmit in the shutter eyeglasses 61 of the viewer 71, whereas the display light LV1 is interrupted in the shutter eyeglasses 62 of the viewer 72.

On the other hand, when a second image V2 is being displayed, both of the right-eye shutter 6R and the left-eye shutter 6L in the shutter eyeglasses 62 used by the viewer 72 are in the open state by the control signal CTL2, and both of the right-eye shutter 6R and the left-eye shutter 6L in the shutter eyeglasses 61 used by the viewer 71 are in the closed state by the control signal CTL1, as illustrated in FIG. 16B. That is, the display light LV2 based on the second image V2 is allowed to transmit in the shutter eyeglasses 62 of the viewer 72, whereas the display light LV2 is interrupted in the shutter eyeglasses 61 of the viewer 71.

These states are repeated alternately in the time-divisional fashion, making it possible for each of the two viewers 71 and 72 to see the mutually-different image, separately (i.e., the images V1 and V2). In the present modification, the shutter eyeglasses 61 and the shutter eyeglasses 62 each correspond to one illustrative example of a "shutter mechanism".

Accordingly, each of the dithering processes described in the embodiment and the modifications is applicable even to an example where the multi-image displaying operation is performed. Therefore, it is possible to obtain an effect equivalent to that of the embodiment and the modifications described above by the operation similar thereto.

In the present modification, each of the mutually-different two images is seen separately by the two viewers. However, each of the embodiment and the modifications described above is applicable to an example where each of three or more images, which are mutually different, is seen separately by three or more viewers. Also, the number of images and the number of shutter eyeglasses may not be necessarily the same. That is, a plurality of shutter eyeglasses, each of which performs an opening-closing operation corresponding to a certain single image, may be provided, and a plurality of viewers may see that single image.

Although the invention has been described in the foregoing by way of example with reference to the embodiment and the modifications, the invention is not limited thereto but rather, may be modified in a wide variety of ways. For example, in the embodiment and the modifications described above, each of the writing of the left-eye image and the writing of the right-eye image is performed twice (or once) when performing the stereoscopic image displaying. However, the number of times of the writing of the image is not limited thereto. Each of the writing of the left-eye image and the writing of the right-eye image may be performed three times or more.

Also, in the embodiment and the modifications described above, although the description has been made with reference to the liquid crystal display device as an example of the display device, which is provided with a liquid crystal display section including the liquid crystal element, the invention is applicable to any other types of display device, which can be a plasma display panel (PDP), an organic electro luminescence (EL), or other suitable display devices, for example.

Further, the process procedure in the embodiment and the modifications described above may be performed by hardware or by software. When the process procedure is performed by software, a program configuring the software is installed into a general-purpose computer, for example. Such a program may be recorded in advance in a recording medium provided in the computer.

In addition, in the embodiment and the modifications described above, the dithering process is performed in the stereoscopic image displaying system and the multi-view system utilizing the shutter eyeglasses. However, the embodiment and the modifications are applicable to an image displaying device which employs the stereoscopic image displaying system or the multi-view system utilizing the shutter eyeglasses, and which utilizes a field-sequential (FS) system to perform color displaying, for example.

Although the invention has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in the present disclosure is intended to be dedicated to the public regardless of whether the element or component is explicitly recited in the following claims.

What is claimed is:

1. A stereoscopic displaying device, comprising:
   a display section cyclically switching a plurality of image streams, thereby time-divisionally displaying the plurality of image streams, each of the plurality of image streams being provided for corresponding one of a plurality of shutter mechanisms performing opening-closing operations at timings different from each other; and
   a dithering processing section performing a dithering process on a plurality of input images by using a plurality of masks, each of the plurality of masks having a pattern of two-dimensionally-arranged gradation-level values, the pattern differing from a pattern of another mask, and then supplying a plurality of resultant images produced through the dithering process to the display section,
   wherein the dithering processing section controls the dithering process in such a manner that the plurality of masks are sequentially and cyclically switched in synchronization with shutter open timings for each of the shutter mechanisms such that all of the plurality of masks are applied to each of the plurality of image streams, and,
   when the plurality of masks are time-divisionally switched, the gradation-level values respectively disposed on the plurality of masks are temporally and spatially averaged,
   wherein the plurality of shutter mechanisms include a left-eye shutter and a right-eye shutter which alternately open and alternately close in an unit-frame period, the plurality of images streams include a stream of left-eye image and a stream of right-eye image having a parallax there between, and the display section performs a first writing operation for writing the left-eye image for display n-times successively and a second writing operation for writing the right-eye image for display n-times successively so that the first and second writing operations are completed within the unit-frame period, where n in an integer equal to or greater than one.

2. The stereoscopic displaying device according to claim 1, wherein the dithering processing section controls the dithering process in such a manner that switching of the masks is not executed within the unit-frame period and is executed for every unit-frame period.

3. The stereoscopic displaying device according to claim 1, wherein the dithering processing section controls the dithering process in such a manner that switching of the masks is executed within the unit-frame period, and that an order of the switching of the masks is varied for every unit-frame period.

4. A stereoscopic displaying system, comprising:
   a plurality of shutter mechanisms performing opening-closing operations at timings different from each other;
   a display section cyclically switching a plurality of image streams, thereby time-divisionally displaying the plurality of image streams, each of the plurality of image streams being provided for corresponding one of the plurality of shutter mechanisms; and
   a dithering processing section performing a dithering process on a plurality of input images by using a plurality of masks, each of the plurality of masks having a pattern of two-dimensionally-arranged gradation-level values, the pattern differing from a pattern of another mask, and then supplying a plurality of resultant images produced through the dithering process to the display section, wherein the dithering processing section controls the dithering process so that the plurality of masks are sequentially and cyclically switched in synchronization with shutter open timings for each of the shutter mechanisms such that all of the plurality of masks are applied to each of the plurality of image streams, and wherein, when the plurality of masks are time-divisionally switched, the gradation-level values respectively disposed on the plurality of masks are temporally and spatially averaged, wherein the plurality of shutter mechanisms include a left-eye shutter and a right-eye shutter which alternately open and alternately close in an unit-frame period, the plurality of images include a stream of left-eye image and a stream of right-eye image having a parallax there between, and the display section performs a first writing operation for writing the left-eye image for display n-times successively and a second writing operation for writing the right-eye image for display n-times successively so that the first and second writing operations are completed within the unit-frame period, wherein n is an integer equal to or greater than one.

* * * * *